United States Patent [19]
O'Byrne et al.

[11] Patent Number: 5,983,839
[45] Date of Patent: *Nov. 16, 1999

[54] DEVICE FOR CONTROLLING BULLING AND RIDING TRAITS IN CATTLE

[76] Inventors: Timothy Patrick O'Byrne, Box 1225, Picture Butte, Alberta, Canada, T0K 1V0; Gordon Ray Roberts, 18 Algonquine Place, Lethbridge Alberta, Canada, T1K 5H2; Cameron Olsen French, 6 Nevada Road W., Lethbridge Alberta, Canada, T1K 4A7; Ludovic Lajos Silasi, 413-19$^{th}$ Street N., Lethbridge Alberta, Canada, T1H 3K4; Oliver Margham Greenhalgh, 1027 Cameron Rd. S., Lethbridge Alberta, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/993,915

[22] Filed: Dec. 18, 1997

[51] Int. Cl.$^6$ ............................ A01K 21/00; A01K 29/00
[52] U.S. Cl. .......................... 119/860; 119/905; 119/869; 119/854
[58] Field of Search ..................... 119/905, 860, 119/711, 654, 809, 811, 868, 869, 854; 239/34, 60

[56] References Cited

U.S. PATENT DOCUMENTS

| | | | |
|---|---|---|---|
| 3,687,114 | 8/1972 | Berkstresser | 119/860 X |
| 4,706,610 | 11/1987 | Morgan, Jr. | 119/654 X |
| 4,926,784 | 5/1990 | Brightful et al. | 119/860 |
| 4,969,917 | 11/1990 | Prue | 119/811 |
| 5,474,033 | 12/1995 | Mitchell, Jr. | 119/860 |

*Primary Examiner*—Michael J. Carone
*Assistant Examiner*—Yvonne R. Abbott
*Attorney, Agent, or Firm*—Lloyd W. Sadler

[57] ABSTRACT

A device for repelling potentially bulling cattle is described. This invention addresses the problem of the mounting and/or riding of confined animals by other cattle confined in the same pen by providing a permeable container which holds a pungent smelling substance and which is easily attachable to the animal which is to be protected. This invention discourages bulling by masking the pheromones of the animal to be protected by an odor which is repellant to cattle. This invention achieves the objective of reducing or eliminating the bulling characteristics of penned bovine in a manner that is cost effective, easy to install and maintain, and which induces no health risk to the animals involved. Thereby, this invention provides, for cattle producers, substantial cost savings, both is reduction of cattle losses and management facilities and labors.

20 Claims, 3 Drawing Sheets

500,839

DEVICE FOR CONTROLLING BULLING AND RIDING TRAITS IN CATTLE

BACKGROUND OF THE INVENTION

1. Field of the Invention

This invention relates to the control of livestock. More specifically, this invention relates to the control of the riding and bulling characteristics of the bovine species. Still more specifically, this invention relates to devices for discouraging the riding and bulling of cattle through use of a pungent smelling substance which is held in a breakable container and which is fixed to the animal to be protected.

2. Description of Related Art

Feedlot steers, which are castrated male cattle, are typically confined in an intensive penning system where, if no control measures are taken, certain cattle will be sexually assaulted, that is mounted and/or ridden, by other steers. The term "bulling" is used to describe the mounting and/or riding of a steer on another animal, either another steer or a cow. Cattle which are mounted and/or ridden by other steers are often seriously harmed or killed during the assault. The damage and loss of cattle due to this problem in feedlots creates a significant cost and management problem to cattle operations. The current technique for controlling a bulling steer is to separate the steer from any other animals which it would either compete or which it would attempt to ride. This separation technique requires separate pens where the offending animals are segregated. Typically the segregation will continue for the rest of the life of the offending animal. Segregation, however, imposes several important problems and costs, First, offending animals can generally only be identified after they have been observed attacking or attempting to attack another animal. This means damage will often be done to other animals before the offending steers can be identified and segregated. Second, segregating certain steers for the duration of their lives requires additional pens and increased management cost for delivering feed and inspection. Alternatively, failure to address this problem of penned cattle leads to injury or death to certain cattle as well as increased stress, which has been linked to lower health and weight, of the penned herd.

The applicant is unaware of any previous animal device, attachable to the animal, which is designed to address this mounting/riding problem among cattle.

SUMMARY OF THE INVENTION

It is desirable to provide a device which can reduce or eliminate the incidences of bulling, mounting, or riding of cattle. Moreover, it is desirable to provide such a device which is cost effective, easy to attach and use, and which will not affect the health of the protected animal.

Therefore, it is the general objective of this invention to provide a device which contains a pungent smelling substance which will repel cattle that otherwise show an interest in bulling.

Another objective of this invention is to provide a device for discouraging the bulling of cattle where the device is easily attachable to the animal to be protected.

A further objective of this invention is to provide a device for discouraging the bulling of cattle where the device does not adversely affect the health of the cattle.

It is a further objective of this invention to provide a device for discouraging the bulling characteristics of cattle where the device is cost effective.

It is a still further objective of this invention to provide a device which discourages the bulling characteristics of cattle by masking the pheromones produced by animals which need protection.

A still further objective of this invention is to provide a device which provides economic savings to the cattle producer and feedlot manager by reducing or eliminating the incidence of mounting or riding of cattle by offending steers, bulls or others of the bovine species.

These and other objectives of this invention will be readily apparent to those of ordinary skill in the art upon review of this patent disclosure, specifically the following drawings, detailed description, claims and abstract. Such objectives are intended to be covered by this patent disclosure.

Reference will not be made in detail to the present preferred embodiment of the invention, an example of which is illustrated in the accompanying drawings.

DETAILED DESCRIPTION OF THE INVENTION

This invention addresses problem of controlling the riding and bulling characteristics of the bovine species by attaching a device, containing a repelling substance, to the tail of the animal needing protection. In its preferred embodiment the device is a relatively small block of foam like material having an internal cavity with a breakable ampule or vial which contains the repellant substance. The breakable ampule or vial is held within the internal cavity of the block of foam like material which is fixed to the tail of the animal by use of adhesive tape.

Figure 1A:
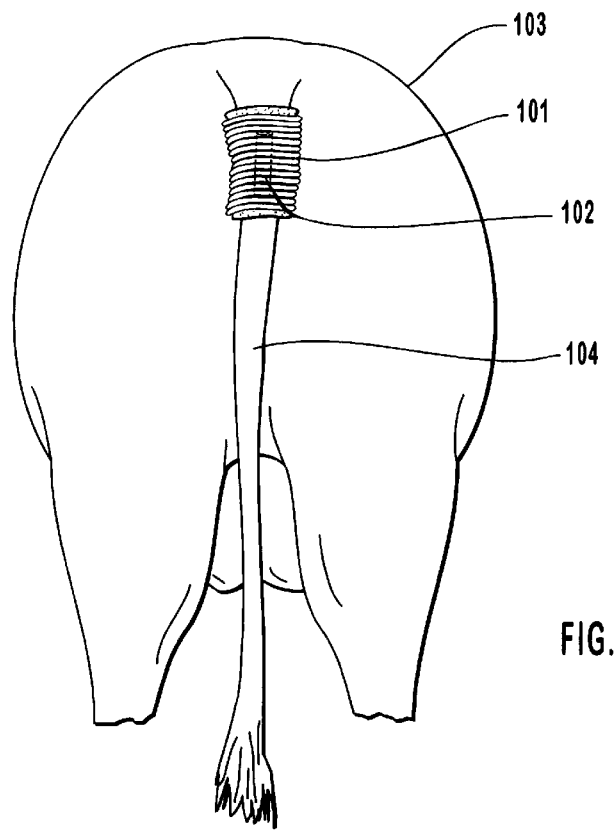
FIG. 1 is a representative drawing of the invention attached to the tail of a protected animal.
Figure 1B:
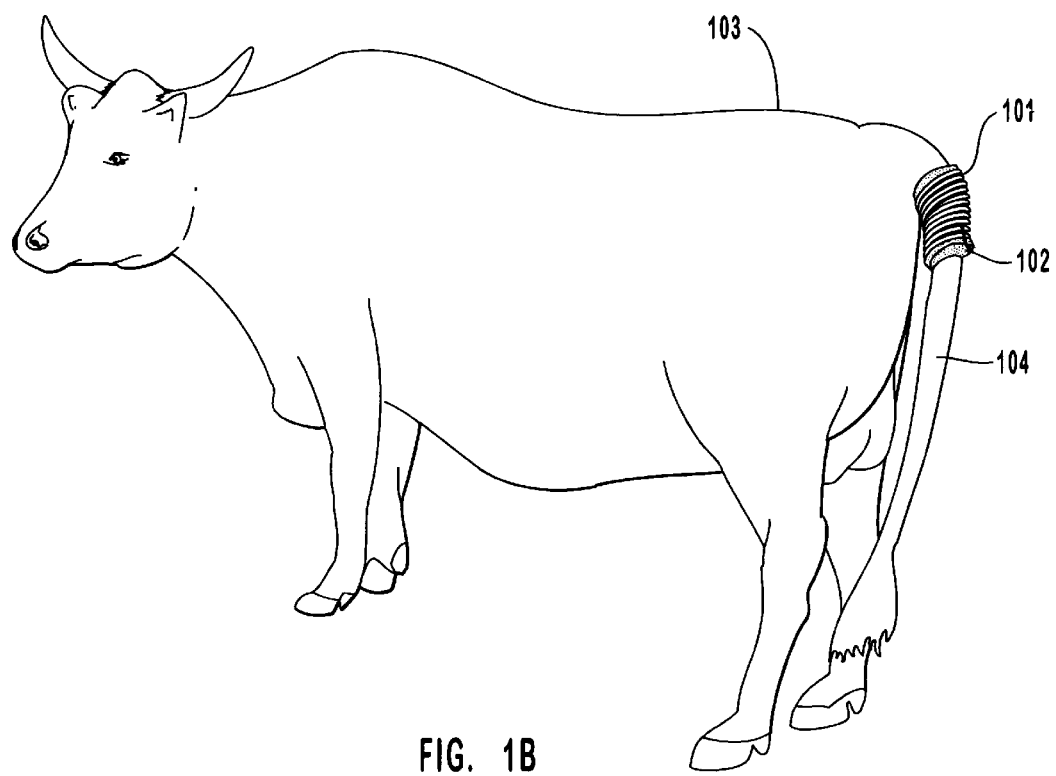

FIG. 1 depicts rear and side views of the invention attached to the tail of a protected animal. The device of the invention 102 is attached using adhesive tape 101 to the tail 104 of an animal 103. Tape 101 as the means of attachment is preferred, although alternative attachment means including but not limited to: hook and loop straps, glue (chemical adhesive), self-locking ties, knotted string, and clips are also contemplated. While the attachment is shown as being high on the animal's tail 104, alternative positions are also contemplated.

Figure 2:
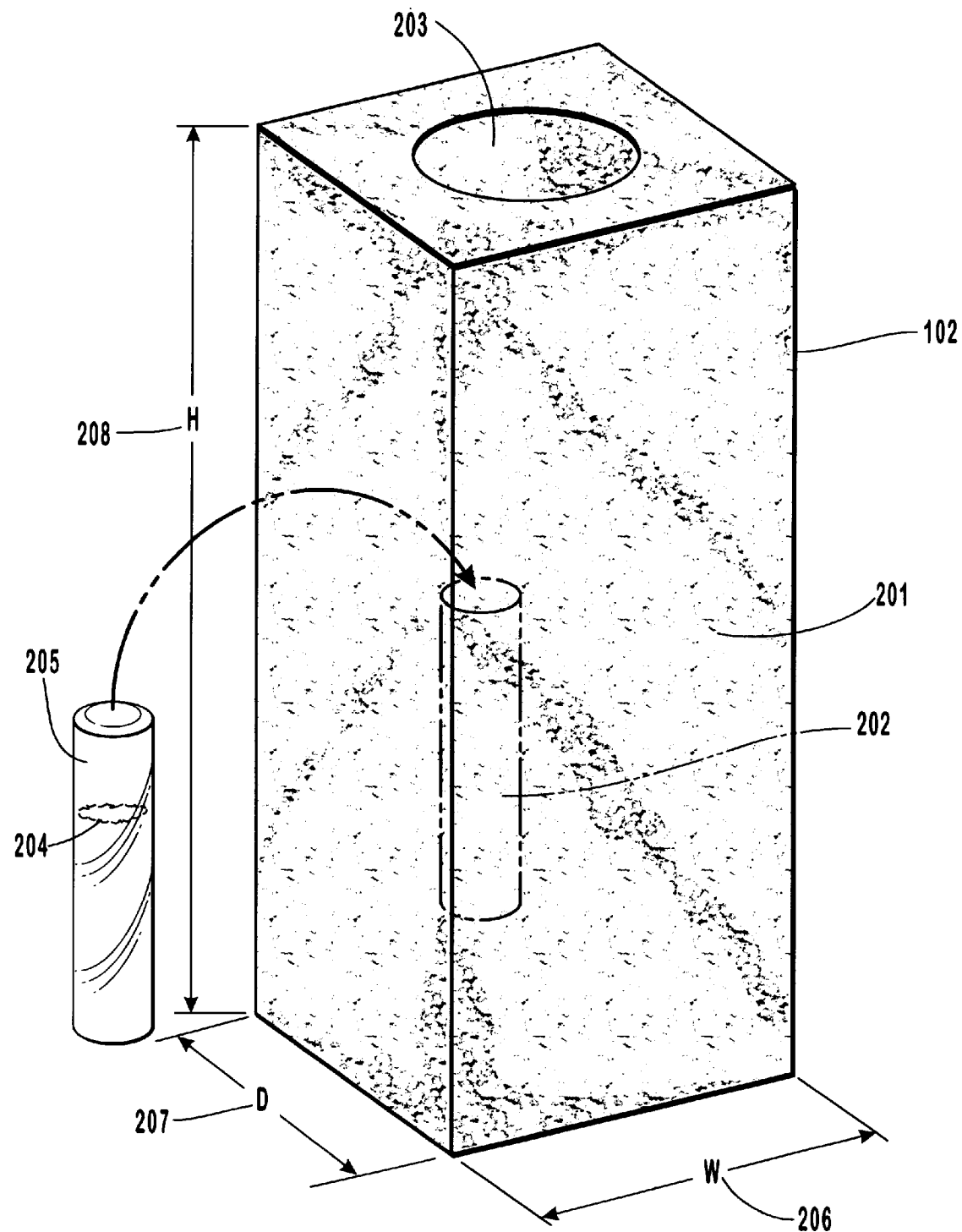
FIG. 2 is a detail drawing of the preferred device of this invention.

FIG. 2 depicts the preferred detailed drawing of the block and ampule components of the invention. In its preferred embodiment the block 201 is composed of a foam material such as foam rubber, although alternative materials such as cloth, cotton, wool, natural or synthetic sponge or other similar generally permeable but liquid retaining material could be substituted without departing from the concept of this invention. The preferred block has an internal cavity 202 for holding the ampule 205 and an opening 203 for inserting the ampule 205 into the block 201. The preferred block 201 is approximately 2 inches in width 206, 2 inches in depth 207 and 6 inches in length 208. Alternative dimensions are contemplated and may be required for animals of different sizes. The ampule 205 is a breakable container, typically made of glass, although alternative embodiments could any impermeable substance, including but not limited to plastic, metal, ceramic. Typically the ampule 205 is sized to fit within the block and to hold approximately 5 ml of liquid repellant 204. Alternative quantities of liquid repellant 204 could be used in alternative embodiments of this invention. The preferred liquid repellant 204 is garlic oil, although alternative repellants are envisioned and could include spices, perfumes or other odor inducing substances. In operation, the ampule 205 containing the repellant 204 is inserted into the block 201 and attached to the animal to be protected. The ampule 204 is broken, either by a person working with the animal or by contact with other animals, and the repellant 204 is released into the block 201 where it is retained for some time, during which an odor is released which serves to repel other animals as well as to mask the particular pheromone of the protected animal.

Figure 3:
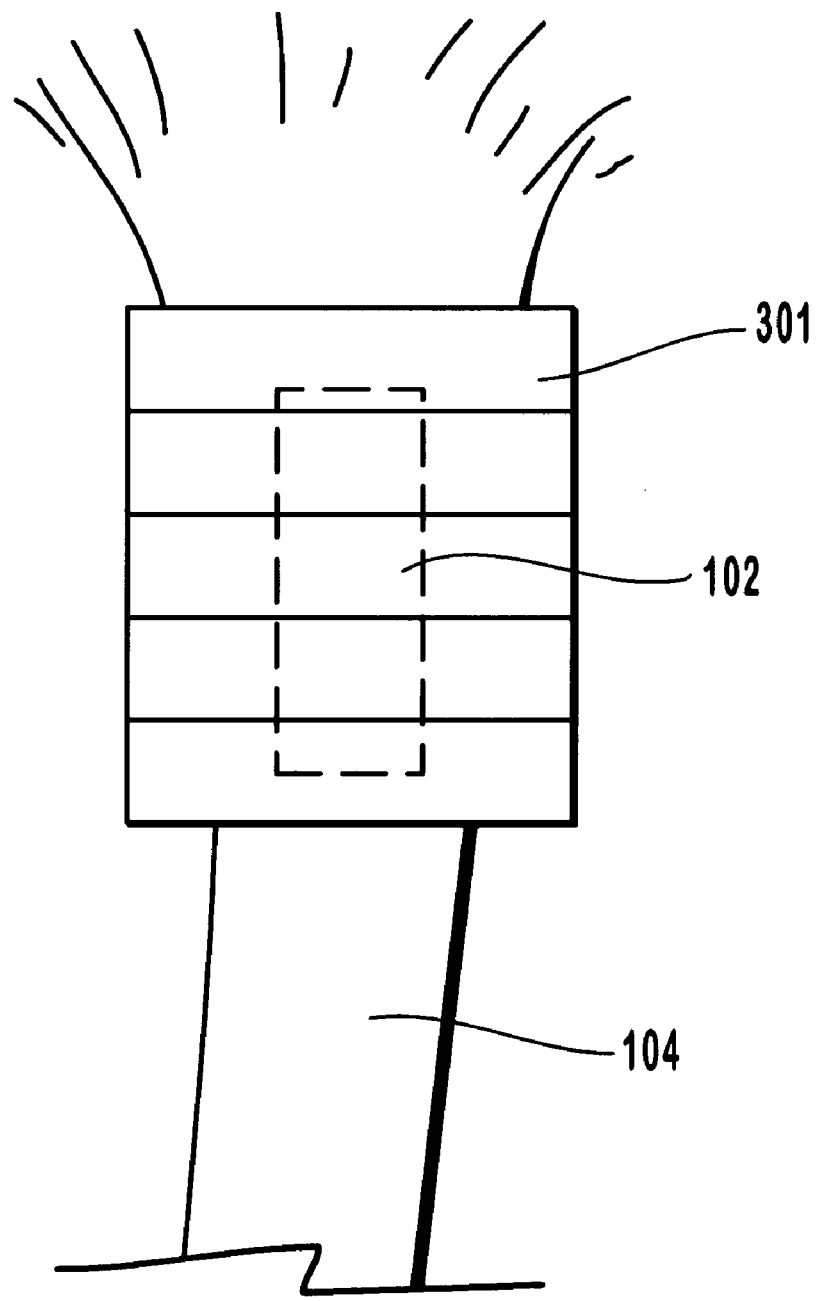
FIG. 3 is a close-up drawing of the attached device of this invention showing particularly the attachment means employed in the preferred embodiment of the invention.

FIG. 3 depicts a close up drawing of the invention 102 attached to the tail 104 of the animal to be protected. The preferred attachment means 301 tape is shown wrapped around the invention 102 and the animals tail 104. This attachment means has the advantage of low cost, ease of installation and removal and relatively permanent. However, alternative attachment means as described above could be substituted without departing from the concept of this invention.

It should be understood that the above described embodiments of the invention are merely illustrative of numerous and varied other embodiments which may constitute applications of the principles of the invention. Such other embodiments may be readily devised by those skilled in the art without departing from the spirit or scope of this invention, and it is the inventors' intent that such other embodiments be deemed to be within the scope of this invention.

We claim:

1. A method for repelling the potentially bulling tendencies of the bovine species, including steers, heifers, and bulls comprising:

(A) attaching a container to a top tail head portion of a first animal by means of an attachment, wherein said first animal is of the bovine species;

(B) breaking said container by bulling;

(C) exposing a pungent smelling substance, held within said container, wherein said pungent smelling substance is adapted to repel bovine animals thereby discouraging the bulling tendencies of such bovine animals; and (D) repelling a second animal.

2. A method for repelling the potentially bulling tendencies of the bovine species, including steers, heifers, and bulls, as recited in claim 1, wherein said container further comprises:

(i) a permeable shell having an internal cavity; and (ii) an ampule held within the internal cavity of said permeable shell.

3. A method for repelling the potentially bulling tendencies of the bovine species, including steers, heifers, and bulls, as recited in claim 2, wherein said permeable shell is further comprised of a synthetic foam material.

4. A method for repelling the potentially bulling tendencies of the bovine species, including steers, heifers, and bulls, as recited in claim 2, wherein said permeable shell is further comprised of foam rubber.

5. A method for repelling the potentially bulling tendencies of the bovine species, including steers, heifers, and bulls, as recited in claim 2, wherein said permeable shell further comprises a cloth material layer.

6. A method for repelling the potentially bulling tendencies of the bovine species, including steers, heifers, and bulls, as recited in claim 2, wherein said permeable shell further comprises a cotton layer.

7. A method for repelling the potentially bulling tendencies of the bovine species, including steers, heifers, and bulls, as recited in claim 2, wherein said permeable shell further comprises a wool layer.

8. A method for repelling the potentially bulling tendencies of the bovine species, including steers, heifers, and bulls, as recited in claim 2, wherein said ampule is further comprised of glass material.

9. A method for repelling the potentially bulling tendencies of the bovine species, including steers, heifers, and bulls, as recited in claim 2, wherein said ampule is further comprised of plastic material.

10. A method for repelling the potentially bulling tendencies of the bovine species, including steers, heifers, and bulls, as recited in claim 2, wherein said ampule is further comprised of metal material.

11. A method for repelling the potentially bulling tendencies of the bovine species, including steers, heifers, and bulls, as recited in claim 2, wherein said ampule is further comprised of ceramic material.

12. A method for repelling the potentially bulling tendencies of the bovine species, including steers, heifers, and bulls, as recited in claim 1, wherein said pungent smelling substance further comprises garlic.

13. A method for repelling the potentially bulling tendencies of the bovine species, including steers, heifers, and bulls, as recited in claim 1, wherein said pungent smelling substance further comprises oil.

14. A method for repelling the potentially bulling tendencies of the bovine species, including steers, heifers, and bulls, as recited in claim 1, wherein said pungent smelling substance further comprises a synthetic perfume.

15. A method for repelling the potentially bulling tendencies of the bovine species, including steers, heifers, and bulls, as recited in claim 1, wherein said pungent smelling substance further comprises a spice.

16. A method for repelling the potentially bulling tendencies of the bovine species, including steers, heifers, and bulls, as recited in claim 1, wherein said attachment further comprises adhesive tape.

17. A method for repelling the potentially bulling tendencies of the bovine species, including steers, heifers, and bulls, as recited in claim 1, wherein said attachment further comprises a hook and loop attachment device.

18. A method for repelling the potentially bulling tendencies of the bovine species, including steers, heifers, and bulls, as recited in claim 1, wherein said attachment further comprises a chemical adhesive.

19. A method for repelling the potentially bulling tendencies of the bovine species, including steers, heifers, and bulls, as recited in claim 1, wherein said attachment further comprises a thread and stitch tie.

20. A method for repelling the potentially bulling tendencies of the bovine species, including steers, heifers, and bulls, as recited in claim 1, wherein said attachment further comprise a self locking tie.

\* \* \* \* \*